United States Patent Office 2,926,060
Patented Feb. 23, 1960

2,926,060

PROCESS FOR THE PRODUCTION OF OXIDATION DYEINGS OR PRINTS, AND COMPOSITIONS

Erich Lehmann, Burscheid, and Helmut Kleiner and Hans-Joachim Manderla, Koln-Stammheim, Germany, assignors to Farbenfabriken Bayer Aktiengesellschaft, Leverkusen, Germany, a corporation of Germany No Drawing. Application January 9, 1958
Serial No. 707,867

Claims priority, application Germany January 16, 1957

11 Claims. (Cl. 8—31)

The present invention relates to new compositions for the preparation of oxidation dyeings and prints and to a process for the manufacture of oxidation dyeings and prints.

In accordance with the invention it has been found that oxidation dyeings or prints may be advantageously produced on materials of vegetable, animal or synthetic origin by using, besides the additives usual in oxidation dyeings, azomethines of aromatic amines, by themselves or in admixture with aromatic hydroxy compounds, in the presence of acid-reacting or acid-yielding agents.

The azomethines of aromatic amines to be used according to the invention are distinguished by an excellent stability in a neutral or weakly alkaline medium. When using aromatic amines without solubilizing groups, combination with aldehyde components containing solubilizing groups such as sulfonic acid or carboxylic acid groups, with the formation of water-soluble Schiff's bases, is of particular technical advantage.

The azomethines are applied, if desired, in admixture with aromatic hydroxy compounds, by the methods known for oxidation dyeing with the addition of agents splitting off acid such as salts or esters of organic or inorganic acids, to materials of vegetable, animal or synthetic origin by dyeing, padding or printing. The dyeing or printing mixtures contain the usual auxiliaries such as oxidizing agents, oxidizing catalysts, solvents, wetting or dispersing agents. The formation of the dyestuffs is effected at an elevated temperature, the azomethines being subjected to acid splitting, the reformed aromatic amines being oxidized by the oxidizing agents present in the mixture, for example chromates, bichromates, peroxides or chlorates, in the presence of small amounts of an oxidizing catalyst such as iron, copper or vanadium salts, to form the dyestuffs. The addition of agents splitting off acid to the dyeing or printing mixtures can be dispensed with if the padded or printed material is subjected to an acid after-treatment, for example to acid steaming. It is also possible to use methods of after-oxidation, for example an after-treatment in chrome acetic acid baths. Moreover, in addition to dyeing in single-colored shades it is also possible to obtain multi-colored prints by adding other dyestuffs, for example vat dyestuffs, or white or colored reservations by printing-on alkaline agents such as zinc oxide.

The following examples are given for the purpose of illustrating the invention without, however, limiting it thereto.

Example 1

100 parts by weight of the azomethine from 4-aminodiphenylamine and the sodium salt of benzaldehyde o-, m- or p-sulfonic acid are dissolved in
250 parts by volume of water, treated with
70 parts by weight of diglycol and
10 parts by weight of 20 percent aqueous ammonia, and stirred into
500 parts by weight of starch tragacanth thickener.
40 parts by weight of ammonium oxalate,
40 parts by weight of sodium chlorate and
20 parts by weight of a 1 percent ammonium vanadate solution are then added to the paste and the mixture is made up to 1000 parts by weight with water.

After printing on cotton, staple fibre, rayon or acetate rayon, the material is steamed for 5–10 minutes, rinsed and soaped. Black prints are thus obtained of very good fastness properties.

The printing paste is stable for several weeks.

Example 2

80 parts by weight of the azomethine from 1,4-diaminobenzene and the sodium salt of benzaldehyde-3-sulfonic acid are worked up into a printing paste as described in Example 1. On cotton, staple fibre and acetate rayon there are thus obtained deep brown shades of good fastness properties. The printing paste is stable for several weeks.

Example 3

100 parts by weight of the sodium salt of the azomethine from 4-diethylamino-1-aminobenzene and the sodium salt of benzaldehyde o-, m- or p-sulfonic acid are dissolved in
600 parts by volume of water and treated with
70 parts by weight of thiodiglycol,
10 parts by weight of 20 percent aqueous ammonia,
40 parts by weight of tragacanth,
40 parts by weight of ammonium oxalate,
40 parts by weight of sodium chlorate and
20 parts by volume of a 1 percent ammonium vanadate solution. The mixture is made up to 1000 parts by weight with water.

Instead of ammonium oxalate there may be used as agents splitting off acid, for instance, ammonium sulfate and ammonium chlorate, and as oxidizing agent instead of ammonium vanadate, for example, ammonium thiocyanate, ammonium acetate, ammonium tartrate, ammonium citrate and ammonium adipate.

The material, for example, cotton, is padded, dried and steamed for 5–10 minutes. After rinsing, soaping and drying, greyish brown dyeings are obtained of very good fastness properties.

The padding mixture is stable for several weeks.

Example 4

60 parts by weight of the azomethine from 2,4-diaminotoluene and the sodium salt of benzaldehyde-4-sulfonic acid are dissolved in
250 parts by volume of water, treated with
50 parts by weight of diglycol and
10 parts by weight of 20 percent aqueous ammonia and introduced into
500 parts by weight of starch-tragacanth thickener.
40 parts by weight of ammonium chloride or ammonium oxalate,
40 parts by weight of sodium chlorate or instead of the above mentioned amount of ammonium chloride and ammonium oxalate 100 parts by weight of an ammonium chlorate solution (13° Bé.), and
20 parts by volume of a 1 percent ammonium vanadate solution are added thereto.

The mixture is made up to 1000 parts by weight.

By printing on cotton, staple fibre or acetate rayon and developing, fast yellowish brown prints are obtained. The printing paste is stable for a prolonged time.

Example 5

80 parts by weight of the azomethine from 3-aminophenol and the sodium salt of benzaldehyde-2-sulfonic acid are dissolved in
250 parts by volume of water and treated with
70 parts by weight of thiodiglycol and
20 parts by weight of 20 percent ammonia water; after introducing into
500 parts by weight of starch-tragacanth thickener, there are added
40 parts by weight of ammonium oxalate,
40 parts by weight of sodium chlorate and
20 parts by volume of a 1 percent ammonium vanadate solution or 25 ml. of a 1 percent copper sulfate solution or 25 ml. of a 2 percent potassium ferricyanite solution.

The mixture is made up to 1000 parts by weight.
On cotton and regenerated cellulose reddish brown shades of good fastness properties are thus obtained.
The printing paste is storable for several weeks.

If using in this example instead of the azomethine from 3-aminophenol and the sodium salt of benzaldehyde-2-sulfonic acid the equivalent amount of the azomethine from 2,4-diaminophenol and the sodium salt of benzaldehyde-3-sulfonic acid brown shades of good fastness properties are obtained.

Example 6

80 parts by weight of the azomethine from 4-amino-4'-methoxy-diphenylamine and the sodium salt of benzaldehyde-2,4-disulfonic acid are worked into a printing paste as indicated in Example 5. Fast black prints are obtained on cotton, staple fibre and acetate rayon.
The printing paste is usable for several weeks.

Example 7

70 parts by weight of the azomethine from 4,4'-diaminodiphenylamine and the sodium salt of benzaldehyde-3-sulfonic acid are dissolved in
250 parts by volume of water and treated with
60 parts by weight of diglycol and
10 parts by weight of 20 percent aqueous ammonia. After stirring into
500 parts by weight of starch-tragacanth thickener, there are added
40 parts by weight of ammonium oxalate,
40 parts by weight of sodium chlorate and
20 parts by weight of a 1 percent ammonium vanadate solution and the paste is made up to 1000 parts by weight with water.
By printing on cotton and other textiles, deep black prints of good fastness properties are obtained.

Example 8

80 parts by weight of the azomethine from 2,4,4'-triaminodiphenyl and the sodium salt of benzaldehyde-2,4-disulfonic acid are worked into a printing paste as indicated in Example 4. Deep brown prints of good general fastness properties are obtained on cotton, staple fibre and acetate rayon. The printing paste is stable for several weeks.

Example 9

24 parts by weight of the azomethine from furfurol and 1,3-diaminobenzene are dissolved in
96 parts by weight of oleic acid polyglycol ether and highly dispersed in
250 parts by volume of water. After the addition of
50 parts by weight of thiodiglycol and
10 parts by volume of 20 percent ammonia, the mixture is worked into
500 parts by weight of a starch-tragacanth thickener and further treated with
30 parts by weight of ammonium chloride and
20 parts by weight of sodium chlorate and
15 parts by volume of a 1 percent ammonium vanadate solution.

The mixture is made up to 1000 parts by weight. When printing on cotton, staple fibre or regenerated cellulose and steaming, fast brown shades are obtained. The printing pastes are storable for a prolonged time without decomposition.

In a similar manner there are obtainable dark bluish-grey shades by using the azomethine from furfurol and 1,5-diaminonaphthalene, fast grey dyeings by means of the azomethine from terephthalaldehyde and 4-aminodiphenylamine, and fast brown shades by means of the azomethine from terephthalaldehyde and 2,4-diamino-1-methylbenzene. In all these cases the printing pastes are stable for a prolonged time without decomposition.

Example 10

100 parts by weight of the azomethine from 1 mol of the sodium salt of benzaldehyde-2-sulfonic acid and 1 mol of 1,5-diaminonaphthalene are dissolved in
300 parts by volume of hot water; into this solution there are introduced
50 parts by weight of diglycol,
10 parts by weight of a 20 percent ammonia solution,
500 parts by weight of starch-tragacanth thickener, and
20 parts by weight of ammonium oxalate.
30 parts by weight of sodium chlorate and
20 parts by weight of a 1 percent ammonium vanadate solution are stirred into the mixture, and the printing paste is made up to 1000 parts by weight.

By printing on cotton, staple fibre or acetate rayon and developing by steaming, fast black dyeings are obtained. The printing pastes are excellently storable.

Example 11

80 parts by weight of the azomethine from 4-aminodiphenylamine and the sodium salt of benzaldehyde-2-sulfonic acid are dissolved at 50–60° in
600 parts by volume of water treated with
10 parts by weight of a 20 percent ammonia,
30 parts by weight of thiodiglycol,
100 parts by weight of an ammonium chlorate solution (13° Bé.) and
20 parts by volume of a 1 percent ammonium vanadate solution and the mixture is made up to 1000 parts by weight.

The solution is padded onto cotton or regenerated cellulose, the padded material is dried and subsequently steamed for 10 minutes, rinsed with water and again dried. A deep black dyeing with excellent fastness properties is thus obtained.

If using in this example instead of 80 parts by weight of the above mentioned azomethine 75 parts by weight of said azomethine in admixture with 5 parts by weight of 1,3-dihydroxybenzene and proceeding in the same manner as described, deep brownish black shades are thus obtained. With 65 parts by weight of the azomethine and 15 parts by weight of 2,7 - dihydroxynaphthalene one obtains black brown shades and with 80 parts by weight of the azomethine and 15 parts by weight of 1,3,5-trihydroxybenzene full brown dyeings or prints.

We claim:

1. Process for the manufacture of oxidation dyeings and prints which comprises applying to the material to be dyed a member selected from the group consisting of a printing paste and a dyeing liquor, said member containing as dyestuff-forming component an azomethine of an aromatic amine, and developing the prints and dyeings by steaming in the presence of an acid.

2. Process according to claim 1 which comprises using as dyestuff-forming components aromatic azomethines containing water-solubilizing groups in the radical of the aldehyde component.

3. Process according to claim 1 which comprises using as dyestuff-forming components azomethines from phenylene diamines and a benzaldehyde monosulfonic acid.

4. Process according to claim 1 which comprises using as dyestuff-forming components azomethines from p-amino-diphenylamine and a benzaldehyde monosulfonic acid.

5. Process according to claim 1 which comprises using the azomethines in admixture with aromatic hydroxy-compounds.

6. A composition for the preparation of oxidation dyeings and prints consisting essentially of an azomethine of an aromatic amine, an oxidizing agent, an oxidizing catalyst, a solvent, a thickener, and a dispersing agent.

7. A composition of claim 6 which contains a compound which forms an acid in the process of oxidation dyeing.

8. Compositions according to claim 7 containing as dyestuff-forming components aromatic azomethines bearing water-solubilizing groups in the radical of the aldehyde component.

9. Compositions according to claim 7 containing as dyestuff-forming components azomethines from phenylene diamines and a benzaldehyde monosulfonic acid.

10. Compositions according to claim 7 containing as dyestuff-forming components azomethines from p-amino diphenylamine and a benzaldehyde monosulfonic acid.

11. Compositions according to claim 7 containing the azomethines in admixture with aromatic hydroxy compounds.

References Cited in the file of this patent

UNITED STATES PATENTS

| | | |
|---|---|---|
| 2,388,903 | Cantrell | Nov. 13, 1945 |
| 2,492,163 | Locke | Dec. 27, 1949 |
| 2,568,579 | Coleman | Sept. 18, 1951 |